United States Patent [19]

Hansson et al.

[11] Patent Number: 5,314,705
[45] Date of Patent: May 24, 1994

[54] PROCESS FOR PREPARING A FROZEN MEAL

[75] Inventors: Lars E. A. Hansson, Aengelholm; Sven I. Palmquist, Bjuv, both of Sweden

[73] Assignee: Nestec S.A., Vevey, Switzerland

[21] Appl. No.: 905,033

[22] Filed: Jun. 26, 1992

[30] Foreign Application Priority Data

Jul. 1, 1991 [EP] European Pat. Off. ........ 91110859.5

[51] Int. Cl.$^5$ ............................................. A23L 1/314
[52] U.S. Cl. .................................... 426/574; 426/393; 426/589; 426/641
[58] Field of Search ............... 426/114, 129, 641, 113, 426/393, 810, 574, 589

[56] References Cited

U.S. PATENT DOCUMENTS

| 3,079,913 | 3/1963 | Nelson | 426/114 X |
| 3,235,390 | 2/1966 | Vischer | 426/641 X |
| 3,415,664 | 12/1968 | Montgomery | 426/113 X |
| 3,681,094 | 8/1972 | Rogers et al. | 426/113 X |

OTHER PUBLICATIONS

Ziemba, "Frozen Dinners", Food Industries, Oct. 1948, pp. 84–87, 426-393.
Abstract of Higashine JP-A-1 120 265 (1989). *Patent Abstracts of Japan.* vol. 13, No. 362, 1989.
Abstract of Nagai JP-A-3 061447(1991). *Patent Abstracts of Japan.* vol. 15, No. 211, 1991.
Abstract of Nagai JP-A-61 205 445 (1986). *Patent Abstracts of Japan.* vol. 11, No. 38, 1987.

*Primary Examiner*—Arthur L. Corbin
*Attorney, Agent, or Firm*—Vogt & O'Donnell

[57] ABSTRACT

Pieces of meat are cooked and then separated from a bouillon and cooled to at least a refrigeration temperature. A thickening agent is mixed with a sauce, which may include the bouillon as an ingredient, at a temperature of from 60° C. to 80° C., and the mixture is cooled and allowed to stand to gel the thickening agent to obtain a gelled sauce which is mixed with the meat pieces and formed into a block which then is frozen. The frozen block is packed in a tray package together with at least one vegetable. The thickening agent is a gelling agent which breaks down at a temperature at which the frozen block is heated for consumption so that upon heating for consumption, the meat and sauce mixture spreads out.

14 Claims, No Drawings

PROCESS FOR PREPARING A FROZEN MEAL

BACKGROUND OF THE INVENTION

The present invention relates to a frozen meal, more particularly to a process for preparing a frozen meal containing meat pieces and one or more vegetables.

In the preparation of frozen meals for the food service industry such as aircraft meals containing meat with, for instance, potatoes and vegetables, pieces of meat are mixed with a cooked sauce, pressed in a standard former into a block, and then frozen and packed with the potatoes and vegetables in alu-trays. The product is normally heated in a convection oven for serving in a tray.

SUMMARY OF THE INVENTION

We have found that if meat pieces are mixed with a sauce gelled with thickener before pressing in a former, a cooked dish for serving has an attractive appearance whereby the meat pieces in the fluid sauce spread out in the tray.

Accordingly, the present invention provides a process for preparing a frozen meal which comprises cooking pieces of meat, cooling, mixing the cooled meat with a sauce gelled with a thickening agent, forming the meat pieces and gelled sauce mixture into a block, freezing the block and finally packing the frozen block with one or more vegetables wherein the thickening agent is a gelling agent which breaks down to a temperature at which the frozen block is heated for consumption so that upon heating for consumption, the meat and sauce mixture spreads out.

DETAILED DESCRIPTION OF THE INVENTION

In accordance with the present invention, the pieces of meat are conveniently diced, chunks, slices, cubes or segments, for instance, of a size normally used in stews or ragout. The pieces of meat may be obtained by dicing meat preferably tempered to a freezing temperature, e.g. $-1°$ C, to $-3°$ C.

Any kind of meat is suitable in the process, for example, beef, pork, calf, lamb, veal, reindeer or chicken.

Before cooking, the meat pieces are advantageously marinated, for instance, with starch, salt or spices. The marination may be carried out by conventional processes such as vacuum tumbling, soaking or injection. After marination, the marinated meat pieces may be browned for instance at about $180°$ to $220°$ C. for a period of from 1 to 3 minutes advantageously in a square belt oven where the meat pieces are conveyed between two teflon belts through the cooking section.

The meat pieces are then cooked by any conventional method, for example, by adding about 20% water and cooking for from 1 to 2 ½ hours, more usually from 1 ½ to 2 hours in the bouillon in a steam cabinet.

After cooking, the meat pieces in the bouillon are cooled conveniently to a temperature from $35°$ to $45°$ C., preferably $38°$ to $42°$ C.

The thickening agent may be a gelling agent that breaks down during freezing and reheating for consumption such as a gum or a starch, e.g., gum arabic or gelatin.

Before adding the thickening agent, the meat pieces are preferably separated from the bouillon, and the meat pieces may be either chilled or frozen. The bouillon is then used in a sauce, e.g., a creamy sauce, to which the thickening agent is or has been added. The amount of bouillon used in the sauce may conveniently be from 10 to 30% by weight. The thickening agent is preferably dissolved or suspended in water at a concentration of from 20 to 30% by weight and added to the sauce at a temperature from $60°$ to $80°$ C. The amount of thickening agent is advantageously from 2 to 4% by weight based on the weight of the sauce.

The sauce is conveniently prepared and heated to a temperature from $90°$ C. to $95°$ C. and cooked for a period of about 4 to 6 minutes and then cooled, preferably to a temperature from $8°$ C. to $15°$ C. The cooling of the sauce may be carried out for instance in a scraped surface heat exchanger or in a kettle.

After cooling, the sauce containing the thickener is allowed to stand to allow the gel to set, e.g., from 15 to 18 hours at a temperature from $6°$ to $15°$ C.

The mixing of the chilled or frozen meat with the cooled sauce containing the thickening agent may be carried out in a meat mixer with gentle mixing for a short time, e.g., from 1 to 3 minutes.

When the sauce is cooled in a scraped surface heat exchanger, the gel strength is reduced and it is preferably mixed with frozen meat, whereas when the sauce is cooled in a kettle, the gel strength is not reduced and it may be mixed with chilled meat, e.g., at a temperature from $1°$ C. to $4°$ C. The use of chilled meat rather than frozen meat is less costly and less water is lost during the chilling process compared with freezing.

After mixing, the meat pieces may be formed in a former to blocks of a standard size before freezing and packing with vegetables such as frozen cooked potatoes, cabbage, carrots, peas, beans, sprouts, brocolli etc.

The following Example further illustrates the present invention.

EXAMPLE

Beef was tempered to $-2°$ C. and diced to pieces having dimensions of $15 \times 20 \times 28$ mm. The diced pieces were then marinated in starch, salt and spices by vacuum tumbling for 10 minutes at $5°$ C. and then browned in a square belt oven for 2 minutes at $200°$ C. The browned diced meat was then cooked in a bouillon in a steam cabinet. After cooking, the meat was cooled to $40°$ C. and the bouillon separated from the meat. The diced meat pieces were chilled to $+2°$ C. while the bouillon was used in an amount of 20% as an ingredient in a sauce to which 3% by weight of gelatin was added at $75°$ C. The gelatin was added solubilised in warm water at $60°$ C. at a concentration of 25 g/100 g water.

After cooking, the sauce was cooled and then allowed to stand for 16 hours at $8°$ C. to allow the gel to set. The chilled or frozen meat and garnish were then mixed with the sauce for 1.5 minutes and then formed in a standard forming equipment and frozen into blocks having dimensions of $60 \times 70 \times 35$ mm. The blocks were then packed with, e.g., frozen, cooked potatoes and vegetables into trays.

When reheated for consumption in a convection oven, the dish has an attractive appearance whereby the meat pieces in a fluid sauce spread out in the tray.

We claim:

1. A process for preparing a frozen meal comprising:
   cooking meat pieces to obtain cooked meat pieces and a bouillon and then separating the cooked meat pieces from the bouillon;

cooling the cooked meat pieces to a temperature so that the cooked meat pieces are at least chilled to obtain cooled meat pieces;

mixing a thickening agent with a sauce at a temperature of from 60° C. to 80° C. to obtain a sauce-thickening agent mixture;

cooling and allowing the sauce-thickening agent mixture cooling and allowing the sauce-thickening agent mixture to stand to gel the thickening agent to obtain a cooled gelled sauce;

mixing the cooled gelled sauce with the cooled meat pieces in a mixer to obtain a meat and gelled sauce mixture;

forming the meat and gelled sauce mixture into a block;

freezing the block to obtain a frozen block; and packing the frozen block in a tray package together with at least one vegetable, wherein the thickening agent is a gelling agent which breaks down at a temperature at which the frozen block is heated for consumption so that upon heating for consumption, the cooked meat and sauce mixture spreads out.

2. A process according to claim 1 further comprising preparing the sauce with the bouillon separated from the cooked meat as a sauce ingredient.

3. A process according to claim 1 further comprising, prior to separating the cooked meat pieces and bouillon, cooling the cooked meat pieces and bouillon to a temperature of from 35° C. to 45° C.

4. A process according to claim 1 wherein the sauce and thickening agent mixture is cooled to and allowed to stand at a temperature of from 6° C. to 15° C. for from 15 hrs. to 18 hrs.

5. A process according to claim 1 wherein the thickening agent mixed with the sauce is contained in water at a concentration of from 20% to 30% by weight.

6. A process according to claim 1 wherein the thickening agent is added to the sauce in an amount of from 2% to 4% by weight based on the weight of the sauce.

7. A process according to claim 1 wherein the thickening agent is a gum.

8. A process according to claim 1 wherein the thickening agent is a gum arabic.

9. A process according to claim 1 wherein the thickening agent is a starch.

10. A process according to claim 9 wherein the thickening agent is gelatin.

11. A process according to claim 1 wherein the cooked meat pieces are cooled to a temperature of from 1° C. to 4° C.

12. A process according to claim 1 wherein the cooked meat pieces are cooled to a temperature so that the meat pieces are frozen.

13. A process according to claim 1 further comprising marinating the meat pieces prior to cooking.

14. A process according to claim 1 further comprising browning the meat pieces before cooking.

* * * * *

UNITED STATES PATENT AND TRADEMARK OFFICE
CERTIFICATE OF CORRECTION

PATENT NO. : 5,314,705
DATED : May 24, 1994
INVENTOR(S) : Lars E.A. HANSSON, et al.

It is certified that error appears in the above-indentified patent and that said Letters Patent is hereby corrected as shown below:

Column 1, line 19, after "with" insert --a--.

Column 3, delete lines 7 and 8, (lines 11 and 12 of claim 1).

Signed and Sealed this

Twenty-third Day of August, 1994

Attest:

BRUCE LEHMAN

Attesting Officer

Commissioner of Patents and Trademarks